(12) United States Patent
Falkenberg

(10) Patent No.: US 8,976,026 B2
(45) Date of Patent: Mar. 10, 2015

(54) ELECTRONIC ANTI-THEFT PROTECTION SYSTEM

(75) Inventor: Verner Falkenberg, Copenhagen S (DK)

(73) Assignee: Alert Metalguard ApS, Copenhagen V (DK)

( * ) Notice: Subject to any disclaimer, the term of this patent is extended or adjusted under 35 U.S.C. 154(b) by 220 days.

(21) Appl. No.: 13/502,340

(22) PCT Filed: Oct. 15, 2010

(86) PCT No.: PCT/DK2010/050272
§ 371 (c)(1),
(2), (4) Date: Aug. 7, 2012

(87) PCT Pub. No.: WO2011/044915
PCT Pub. Date: Apr. 21, 2011

(65) Prior Publication Data
US 2012/0299729 A1    Nov. 29, 2012

Related U.S. Application Data

(60) Provisional application No. 61/272,659, filed on Oct. 16, 2009.

(30) Foreign Application Priority Data

Oct. 16, 2009   (DK) ............................ PA 2009 70160

(51) Int. Cl.
*G08B 13/14*     (2006.01)
*G08B 13/24*     (2006.01)
*G01V 3/08*      (2006.01)

(52) U.S. Cl.
CPC .............. *G08B 13/2402* (2013.01); *G01V 3/08* (2013.01)

USPC ......................................... 340/568.1; 340/661

(58) Field of Classification Search
USPC .................................... 340/568.1, 661, 686.1
See application file for complete search history.

(56) References Cited

U.S. PATENT DOCUMENTS 3,676,772 A    7/1972  Lee
3,971,983 A    7/1976  Jaquet
(Continued)

FOREIGN PATENT DOCUMENTS

DE          3402 562 A1    8/1985
EP          0 615 217 A1   9/1994
(Continued)

OTHER PUBLICATIONS

International Search Report for PCT:DK2010:050272, mailed Feb. 8, 2011.

(Continued)

*Primary Examiner* — Shirley Lu
(74) *Attorney, Agent, or Firm* — Brinks Gilson & Lione

(57) ABSTRACT

The invention relates to an electronic system for anti-theft protection of goods. The system comprises: a unit for detecting a metallic material in a first detection zone; a unit for detecting a magnetic or magnetizable material in a second detection zone; and a control unit. The control unit is capable of receiving information from the units for detecting metallic and magnetic material when the one or both of these units detect(s) a metallic or a magnetic material, respectively, in the respective detection zones. The control unit is further programmable to the effect that the control unit can be programmed to emit a signal which depends on whether it receives information about the detection of metallic and/or magnetic material.

14 Claims, 3 Drawing Sheets

(56) References Cited

U.S. PATENT DOCUMENTS

| | | | |
|---|---|---|---|
| 6,133,829 | A | 10/2000 | Johnstone |
| 6,150,810 | A | 11/2000 | Roybal |
| 6,541,966 | B1 | 4/2003 | Keene |
| 7,154,266 | B2 | 12/2006 | Czipott |
| 7,295,107 | B2 | 11/2007 | Massengill |
| 7,961,096 | B2 | 6/2011 | Hall |
| 8,199,013 | B2 | 6/2012 | Bergman |
| 8,264,348 | B2 | 9/2012 | Dinh |
| 8,264,353 | B2 | 9/2012 | Dinh |
| 8,416,078 | B2 | 4/2013 | Sayegh |
| 8,576,045 | B2 | 11/2013 | Allen |
| 2004/0147833 | A1 | 7/2004 | Czipott |
| 2004/0244625 | A1* | 12/2004 | Tiernan et al. ............... 102/221 |
| 2009/0066481 | A1* | 3/2009 | Hansen et al. ............... 340/10.2 |
| 2010/0001872 | A1* | 1/2010 | Lian et al. .................... 340/661 |
| 2011/0109455 | A1 | 5/2011 | Bergman |

FOREIGN PATENT DOCUMENTS

| | | |
|---|---|---|
| EP | 736850 A1 | 10/1996 |
| EP | 0 999 531 A1 | 5/2000 |
| GB | 2154350 A | 9/1985 |
| GB | 2247382 A | 2/1992 |
| WO | WO 2008/028487 A1 | 3/2008 |
| WO | 2008125621 A1 | 10/2008 |
| WO | WO 2010/005499 A2 | 1/2010 |

OTHER PUBLICATIONS

International Report on Patentability for PCT:DK2010:050272, completed Jan. 25, 2012.

Search Report for Application No. PA 2009 70160, dated Apr. 15, 2010.

* cited by examiner

ELECTRONIC ANTI-THEFT PROTECTION SYSTEM

RELATED APPLICATIONS

This application claims the benefit under 35 U.S.C. §371 of International Patent Application No. PCT/DK2010/050272, having an international filing date of Oct. 15, 2010, which claims priority to Danish Patent Application No. PA 2009 70160, filed Oct. 16, 2009, and U.S. Provisional Application No. 61/272,659, filed Oct. 16, 2009, the contents of all of which are incorporated herein by reference in their entirety.

The invention relates to an electronic system for protecting against theft of goods, said system comprising: a unit for detecting a metallic material in a first detection zone; a unit for detecting a magnetic or magnetisable material in a second detection zone; and a control unit.

Today, anti-theft protection of goods in eg stores or supermarkets is accomplished to a wide extent by tagging of the individual goods. The known systems for preventing theft usually comprise the so-called anti-theft tokens that are attached to the goods in the shop.

In clothing shops, the anti-theft protection is often constituted of a two-part anti-theft token, wherein the one part comprises a pin which is inserted through the item of clothes and locked to the other part of the anti-theft protection. Moreover the anti-theft token contains a unit that can be detected by an anti-theft arrangement located at the exit of the shop. The lock in the anti-theft token is released by means of a magnet, a so-called releaser, and that release is intended to take place at the cash-register following purchase of the item of clothing.

However, it is now a problem that shoplifters bring a magnet/releaser and, by means thereof, take off the anti-theft token to the effect that the anti-theft arrangement is unable to detect a stolen item when the item passes by the anti-theft arrangement. This is typically done in areas of the shop, where, for the sake of decency, the customers are not monitored visually, eg in fitting rooms or lavatories.

Protection of goods against theft can also be accomplished by means of eg a coil, a magnet, or a small radio transmitter which is contained in stickers on the goods and has the particular ability of containing information, without battery, which is released when it passes a magnetic field or is exposed to a radio signal. By tagging each individual item in eg a supermarket with this kind of anti-theft protection, it is thus also possible to record whether goods that are not paid for pass by selected points. This is typically done at the cash-registers or the exits as such of the shops.

However, professional thieves have long been aware that such electronic anti-theft protections can be circumvented by shielding the stolen goods from the surroundings by means of a radiation shield, a so-called "Faraday cage" which eliminates all electric influence from the outside or from within. Usually this takes place quite simply by insulating eg a carrier bag or a rucksack/bag with an interior layer of a conductive material, such as eg tinfoil, but, in principle any conductive material can be used. Such insulated receptacle efficiently prevents any detection of tagged goods contained therein and therefore it also prevents discovery of any stolen goods that may be present in the insulated container, and therefore such insulated receptacles, in everyday terms designated "booster bags", are also the direct cause of a considerable loss of goods in is the retail trade.

Therefore, today metal detectors have also been introduced that are capable of detecting such "booster bags", and today an efficient anti-theft protection of goods consists of both sensors for detecting the signals that are emitted from the tagged goods and metal detectors for detecting "booster bags".

Metal detectors are commonly known to the person skilled in the art and may be made eg as described in U.S. Pat. No. 6,133,829, JP 8 050 690 or EP 0 736 850, and therefore their functionalities will not be described in further detail.

Magnet detectors are also well-known to the person skilled in the art and may be made eg as described in U.S. Pat. No. 3,971,983.

However, ordinary trolleys of steel constitute a problem as they are also detected by the metal detectors which are therefore caused to emit "false alarms" each time a trolley passes a metal detector.

There is therefore a need for a system that minimises the above drawbacks.

This is accomplished by the control unit being capable of receiving information from the units for detecting metallic and magnetic material when the one or both of these units detect(s) a metallic or a magnetic material, respectively, in the respective detection zones, and by the control unit being programmable to the effect that the control unit can be programmed to emit a signal which depends on whether it receives information about the detection of metallic and/or magnetic material in the detection zones.

Hereby an improved anti-theft protection system is accomplished which may prevent false alarms.

Embodiments of the invention will be provided in the independent claims.

The term "metallic material" is to be construed as comprising means that are usually considered to be amagnetic, including but not restricted to eg tinfoil, aluminium, austenitic stainless steel or gold and silver. Those materials may be detected by means of metal detectors, but not by detectors that sense magnetic/magnetisable materials. By magnetic materials is to be understood materials that can be magnetised, including iron (Fe), nickel (Ni) and cobalt (Co).

The terms "sensing device, sensor or detector" are to be construed as electronic apparatuses that may, in given situations, give deflections when detecting/measuring magnetic or metallic objects within a given volume/area which may ensuingly be designated the detection zone and/or sensing/measuring area.

Programming is not to be construed as something which is necessarily software-related; rather it may also mean that one merely moves to wires in a series of switches.

In the following, an embodiment of the invention will be explained with reference to the figures, wherein FIG. 1 is a schematic drawing of the earth's magnetic field;

FIGS. 5A-5D schematically show how a customer wearing a rucksack passes by an embodiment of a system according to the invention.

Figure 1:
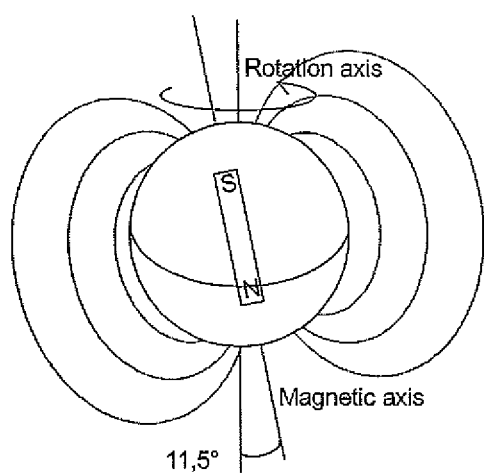

FIG. 1 shows a drawing of the earth's magnetic field as it runs between the North Pole and the South Pole, and the invention contains a sensor that registers the changes thereto. Such sensors are known and used today in a version capable of measuring changes to the magnetic field in three dimensions, eg for electronic compasses for use in airplanes, mobile phones, measurement of current in a wire, or for traffic detection.

Thus, the sensor may measure magnetic fields from permanent magnets (eg the earth's magnetic field) and electromagnetic fields generated by a current (ac or dc) in a wire.

Figure 2:
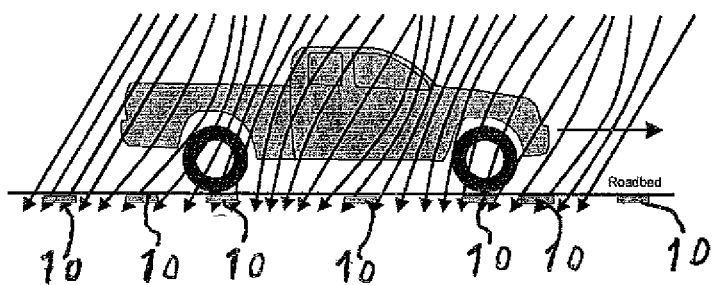
FIG. 2 shows, seen from above and schematically, how the earth's magnetic field is changed by a car.
Figure 3:
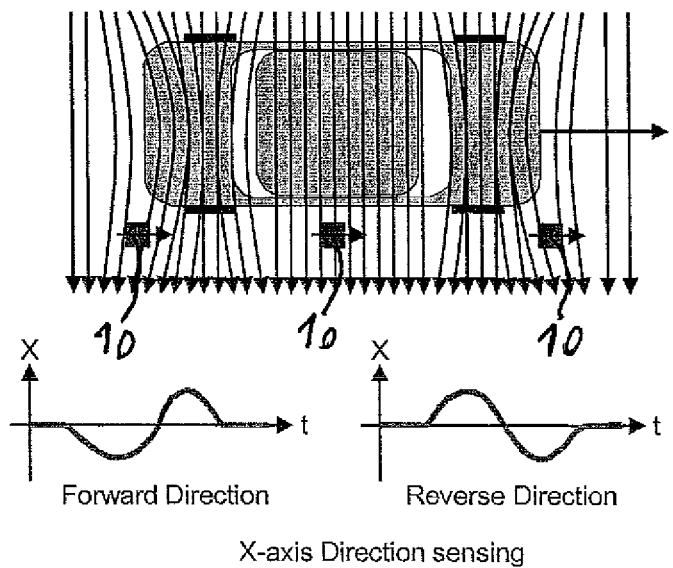
FIG. 3 shows, seen from the side and in a schematic view, how the earth's magnetic field is changed by a car.

FIGS. 2 and 3 schematically show how such sensors (10) that are deployed in a roadway may measure the changes to the earth's magnetic field when a car passes by.

Figure 4:
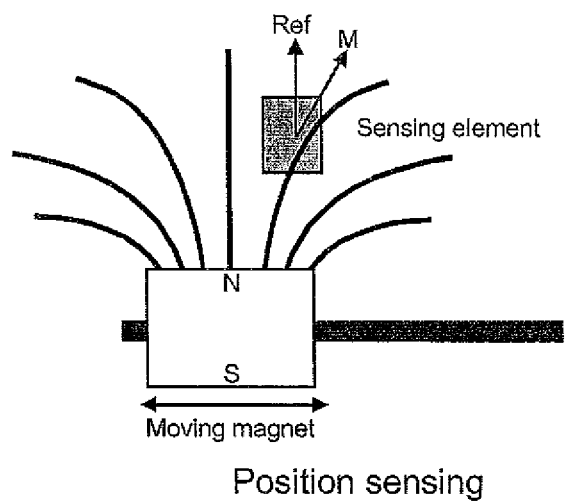
FIG. 4 is a schematic drawing showing the functionality of a magnetic sensor.

FIG. 4 shows an example of registering a moving magnet.

The invention relates to a system containing both such "magnetic" sensor and a sensor capable of detecting metallic materials by means of two antennae (1x transmitter (TX) and 1x receiver (RX)) that are typically arranged as a gate eg at the entrance or the exit of a shop. The metal sensor registers all types of metal of a given size and volume. The known anti-theft systems contain only a metal detector and the purpose of that is to register the passing by of bags, rucksacks, bags or the like that are insulated/lined with eg aluminium foil. It is a drawback of those systems that trolleys are also detected by this system and they may consequently be a source of false alarms.

By combining a magnetic sensor with a sensor capable of detecting metallic materials, a system is accomplished where the control unit may be programmed to give different deflections depending on whether it is a bag lined with aluminium or a trolley that travels through a zone in which both sensors make measurements. If it is such a bag, only the metal detector will give deflections, whereas both metal detector and magnetic detector will give deflections if a trolley of iron passes through the common detection zone of the sensors. As mentioned above, the metal sensor detects—depending on its setting—only metallic material above a certain size and it is consequently possible to pass by it with a bundle of keys or a magnet in one's pocket without the metal sensor registering it.

By providing the system with a suitable control unit, the system can thus be programmed to emit alarms eg only if registration is accomplished of either rmagnetic material, amagnetic metallic material or both in a shared measurement area (detection zone). Thereby a system is accomplished which is—as a minimum—capable of differentiating between three situations:
1. A booster bag which is lined with eg aluminium foil, since only the metal detector will respond to it;
2. A magnet, since only the magnet sensor will sense it;
3. A trolley since both sensor types will register it.

Usually, the system's control unit will be programmed such that the system does not emit an alarm when trolleys pass by the system; ie when both sensors register an item (situation 3 above).

FIGS. 5A-5D show an embodiment of a system according to the invention which a person wearing a rucksack passes by. The system comprises two antennae (1, 2) arranged such that the customers have to pass there between.

In each of the two antenna systems (1, 2) magnet sensors (3) and metal detectors (1, 2), respectively are arranged; however, neither of them are, in the shown embodiment, shown in detail—and the sensors are arranged such that they have a coinciding measurement area. Thus, both sensor types will register when the trolley enters the shared measurement zone, see optionally FIG. 5B (situation 3 above) and, as mentioned above, the system will normally be set such that, in this situation, the control unit does not emit an alarm.

Figure 5A:
Figure 5A:
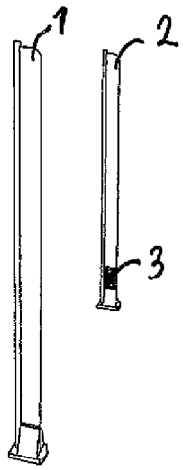
Figure 5B:
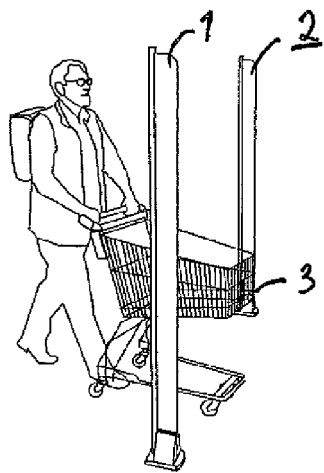
Figure 5C:
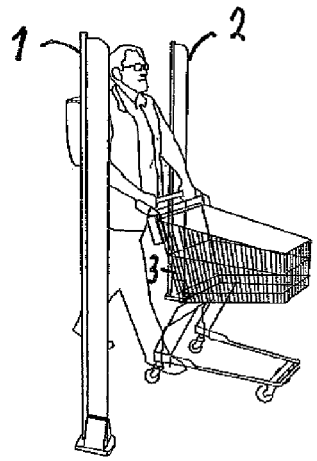
Figure 5D:

Then, the system will register that the trolley leaves the measurement area, see optionally FIG. 5D, as the magnet sensor will stop detecting its presence, whereas only the metal detector/sensor will register the rucksack—if it is lined with eg aluminium foil—while being in the measurement area as shown in FIG. 5D (situation 1 above), and here the control unit is to emit an alarm to the effect that a metal object/a booster bag is present.

If, instead of a lined rucksack, the customer brings in a magnet, the sequence will be to first register a trolley (situation 3) and then to register magnetic material/a magnet (situation 2), and here the control unit is to emit an alarm.

By a three-axis magnetic sensor/sensing device, it is possible to calculate an angle relative to the magnetic object moving through the gate. This means that it is possible to measure the direction in which the magnetic object moves through the gate.

Moreover, it is possible to arrange a three-axis magnetic sensor in each antenna. This provides the option of calculating the angle from each of the magnetic sensors/sensor devices to the magnetic object and hence to make a cross-bearing. In this way, the location or even the velocity of a detected object may be determined. The control unit may furthermore be programmed such that it disregards situations where the velocity or the position of this object is in an area which is unrealistic for an object transported by a customer.

By combining the information from the two sensor systems, it is possible to set up a system where one may chose between different functions and properties.

The metal detector without magnetic detection. This system functions like the presently known systems.

Magnet detection without metal detection. This system is targeted to the fitting rooms of clothes shops.

Metal detection with magnet detection where the metal detector is used for registering a bag lined with aluminium, and the combination is used to register the trolley, and the magnetic sensor is used to detect a magnet (situation 2).

The latter configuration may be used to advantage in the fitting rooms of clothes shops (where it is suspected that anti-theft tokens are removed by means of magnetic releasers brought along), and wherein there is a traffic flow of trolleys and/or prams.

Thus, the system may be configured in the following ways:

| Metal On/off 1 | Magnetic On/off 2 | Combi On/off 3 | Event Passage through or in proximity of gate(s) | Metal System Metal | Magnetic system Magnetic |
|---|---|---|---|---|---|
| ON | OFF | OFF | Booster bag | Yes | OFF |
| ON | OFF | OFF | Trolley | Yes | OFF |
| ON | OFF | OFF | Magnet | No | OFF |
| ON | OFF | OFF | Booster bag + magnet | Yes | OFF |

In the above configuration the magnet detection system is off and the system serves as a conventional metal detection system.

| Metal On/off 1 | Magnetic On/off 2 | Combi On/off 3 | Event Passage through or in proximity of gate(s) | Metal System Metal | Magnetic system Magnetic |
|---|---|---|---|---|---|
| OFF | ON | OFF | Booster bag | OFF | No |
| OFF | ON | OFF | Trolley | OFF | Yes |
| OFF | ON | OFF | Magnet | OFF | Yes |
| OFF | ON | OFF | Booster bag + magnet | OFF | Yes |

In the above configuration, the metal detection system is off, and the system serves as system capturing magnetic material.

| Metal On/off 1 | Magnetic On/off 2 | Combi On/off 3 | Event Passage through or in proximity of gate(s) | Metal System Metal | Magnetic system Magnetic |
|---|---|---|---|---|---|
| ON | ON | OFF | Booster bag | Yes | No |
| ON | ON | OFF | Trolley | Yes | Yes |
| ON | ON | OFF | Magnet | No | Yes |
| ON | ON | OFF | Booster bag + magnet | Yes | Yes |

In the above configuration, both the metal detection system and the magnet detection system is on, and by programming of the control the system may hereby respond on either of:
  Booster bags as they will give unequivocal information from the detectors/sensors, viz. positive deflection for metal simultaneously with negative deflection for magnetic material.
  Magnets as they will give unequivocal information from the detectors/sensors, viz positive deflection for magnetic material simultaneously with negative deflection for metals.
  Booster bags with magnets and/or shopping carts/trolleys, as both give positive deflections for both magnetic material and metals.

In normal conditions, one would program the control such that, like the prior art systems, alarm is given on booster bags, but, as opposed to earlier systems, it is possible by the present invention to provide a system that can also be used to emit alarm in case of magnets passing by. And also a system which omits to emit an alarm when trolleys pass by.

The invention is not restricted to the embodiment shown, but is set forth in the claims.

The invention claimed is:

1. An electronic system for anti-theft protection of goods, said system comprising:
  a unit for detecting a metallic material in a first detection zone;
  a unit for detecting a magnetic or magnetisable material in a second detection zone; and
  a control unit,
wherein the control unit is configured to receive information from the units for detecting metallic and magnetic material when the one or both of these units detect a metallic or a magnetic material, respectively, in the respective detection zones, and is programmable to cause the control unit to emit a signal indicative of whether the control unit receives information about the detection of metallic and magnetic material, and whether the control unit receives information about the detection of a metallic material, while simultaneously not receiving information about the detection of magnetic materials, wherein the unit is configured to determine a position of a material that is both metallic and magnetic, wherein when the material is detected at a first position, the control unit does not emit the alarm and when the material is detected at a second position, the control unit emits the alarm.

2. An electronic system for anti-theft protection of goods according to claim 1, wherein the first detection zone and the second detection zone are coinciding.

3. An electronic system for anti-theft protection of goods according to claim 1, wherein the first detection zone and the second detection zone are overlapping.

4. An electronic system for anti-theft protection of goods according to claim 1, wherein the first detection zone and the second detection zone are discrete.

5. An electronic system for anti-theft protection of goods according to claim 1, wherein the control unit emits an alarm when the control unit does not receive information on metallic material simultaneously with it receiving information about the detection of magnetic material in a zone in which it is possible to detect both magnetic and metallic material.

6. An electronic system for anti-theft protection of goods according to claim 1, wherein the control unit is further programmable to cause the control unit to disregard information from the unit for the detection of a metallic material.

7. An electronic system for anti-theft protection of goods according to claim 1, wherein the control unit is further programmable to cause the control unit to disregard information from the unit for the detection of a magnetic material.

8. An electronic system for anti-theft protection of goods according to claim 1, wherein the control unit is further programmable to cause the control unit to not emit an alarm when it receives information about the detection of both metallic and magnetic materials.

9. An electronic system for anti-theft protection of goods according to claim 1, wherein the unit for detecting a magnetic material comprises a unit which is capable of detecting changes to the earth's magnetic field.

10. An electronic system for anti-theft protection of goods according to claim 1, wherein the unit for detecting a magnetic material comprises a unit which is capable of detecting changes to the earth's magnetic field in three dimensions.

11. An electronic system for anti-theft protection of goods according to claim 1, wherein the system comprises at least two units for detecting a magnetic material; and that these units may each separately detect changes to the earth's magnetic field in three dimensions.

12. An electronic system for anti-theft protection of goods according to claim 1, wherein the system comprises at least two units for detecting a magnetic material, at least one of which is configured to detect changes to the earth's magnetic field in three dimensions; wherein the at least two units are arranged relative to each other to facilitate estimation of the position of a magnetic magnetisable material in their shared detection zone by the control unit.

13. An electronic system for anti-theft protection of goods according to claim 12, wherein the system comprises at least two units for detecting a magnetic material, at least one of which is configured to detect changes to the earth's magnetic field in three dimensions; and wherein the at least two units are arranged relative to each other to facilitate estimation of the velocity of a magnetic or magnetisable material in their shared detection zone by the control unit.

14. An electronic system for anti-theft protection of goods according to claim 13, wherein the system comprises a display; and that the display provides information on whether the units for detecting a metallic and magnetic material detect those materials.

* * * * *